C. D. BREMER.
AIR PUMP NIPPLE.
APPLICATION FILED FEB. 20, 1914.
1,111,991.
Patented Sept. 29, 1914.
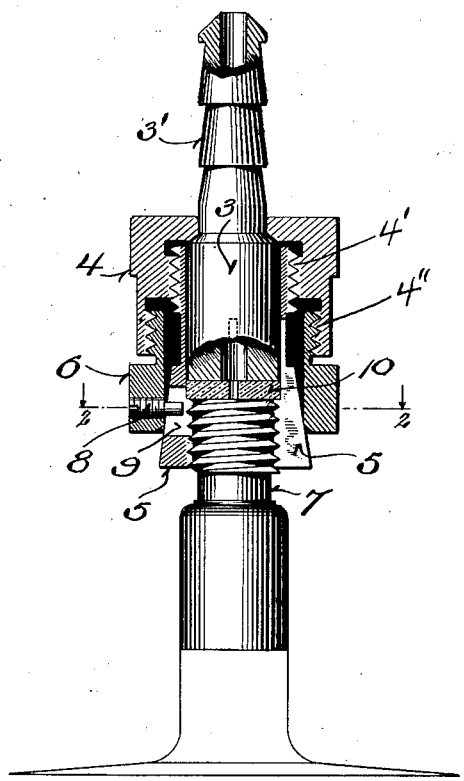
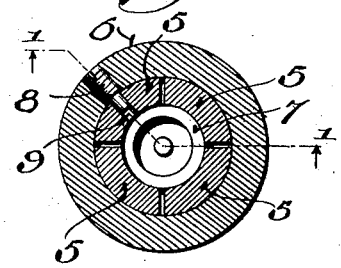

UNITED STATES PATENT OFFICE.

CHARLES D. BREMER, OF MILWAUKEE, WISCONSIN.

AIR-PUMP NIPPLE.

1,111,991.  Specification of Letters Patent.  Patented Sept. 29, 1914.

Application filed February 20, 1914. Serial No. 819,870.

*To all whom it may concern:*

Be it known that I, CHARLES D. BREMER, a citizen of the United States, and resident of Milwaukee, in the county of Milwaukee and State of Wisconsin, have invented certain new and useful Improvements in Air-Pump Nipples; and I do hereby declare the following is a full, clear, and exact description thereof.

My invention consists in what is herein particularly set forth with reference to the accompanying drawings and pointed out in the claims of this specification, its object being to provide simple, economical and efficient nipples with which to effect air-tight connection of air-pumps with valve-nipples of pneumatic-tires or other inflatable devices.

Figure 1 of the drawings represents a partly sectional elevation of an air-pump nipple in accordance with my invention attached to a valve-nipple applicable to a pneumatic-tire or other inflatable device, the section being indicated by line 1—1 in Fig. 2, and Fig. 2, represents a horizontal sectional view indicated by line 2—2 in Fig. 1.

Referring by numerals to the drawings, 3 indicates a cylindrical nozzle having a reduced and conically stepped shank 3' engageable with an end of an air-pump hose or otherwise connected to the pump, similar nozzles being of common knowledge. Engaging the nozzle and its shank is a nut 4 counter-bored from its inner end, there being preferably beveled contact of a counter-bore opening in the head of the nut with a shoulder of said nozzle. A smaller diameter of the nut-bore has a right-hand screw-thread 4' in engagement with a corresponding screw-thread externally of spring expander-sections 5, and the greatest diameter of said nut-bore has a left-hand screw-thread in engagement with a corresponding screw-thread 4" of a shank of sleeve 6 that is slidable on outwardly inclined ends of the expander-sections. These outwardly inclined ends of the expander-sections are interiorly screw-threaded to match the screw-thread of a valve-nipple 7 of a pneumatic-tire or other inflatable device, and a stop 8 in connection with the sleeve 6 engages a longitudinal slot 9 in one of said expander-sections, said stop being preferably a screw having a reduced pin end in said slot as is herein shown.

Set in on shoulders of the expander-sections and facing the adjacent end of the nozzle 3 is a centrally apertured packing-disk 10 compressible between said nozzle and the valve-nipple 7 aforesaid.

In practice, the nut 4 having been run out to retract the sleeve 6 and thus permit automatic spread of the expander-sections 5, the air-pump nipple is set on the valve-nipple 7 of the pneumatic-tire or other device to be inflated, the packing-disk 10 seating on said valve-nipple. Now by running in of the nut 4, a compression of the packing-disk 10 is had between the nozzle 3 and the valve-nipple 7, and at the same time the sleeve 6 is caused to slide inward to effect a gripping of the inner screw-thread of the expander-sections 5 with the screw-thread of said valve nipple, whereby a secure air-tight union of the air-pump nipple with the aforesaid valve-nipple results.

I claim:—

1. An air-pump nipple comprising a nozzle, a counterbored nut having a screw-thread of one direction in a smaller diameter of its bore and similar thread of the opposite direction in the greatest diameter of said bore, spring expander-sections fashioned inwardly at one end to match the screw-thread of a valve-nipple and having external screw-thread engaging that of said smaller diameter of the nut-bore, a sleeve slidable on outwardly inclined ends of the expander-sections and having a shank provided with a screw-thread engaging that of the greatest diameter of said nut-bore, a stop with the sleeve engaging a longitudinal slot in one of the expander-sections, and a centrally apertured nozzle-facing packing-disk seated on inner shoulders with which the expander-sections are provided.

2. An air-pump nipple comprising a nozzle, a counterbored nut having a right-hand screw thread in a smaller diameter of its bore and a left-hand screw-thread in the greatest diameter of said bore, spring expander sections fashioned inwardly at one end to match the screw-thread of a valve-nipple and having external screw-thread engaging the right-hand thread of the nut, a sleeve slidable on outwardly inclined ends of the expander-sections and having a shank provided with a screw-thread engaging the left-hand thread of said nut, a stop with the sleeve engaging a longitudinal slot in one of the expander-sections, and a centrally apertured nozzle-facing packing-disk seated on inner shoulders with which the expander sections are provided.

3. An air-pump nipple comprising a nozzle, a counterbored nut having screw-thread of one direction in a smaller diameter of its bore and similar thread of the opposite direction in the greatest diameter of said bore, spring expander-sections fashioned inwardly at one end to match the screw-thread of a valve-nipple and having external screw-thread engaging that of said smaller diameter of the nut-bore, a sleeve slidable on outwardly inclined ends of the expander-sections and having a shank provided with a screw-thread engaging that of the greatest diameter of said nut-bore, a sleeve-engaging screw having a reduced pin end extending into a longitudinal slot of one of the expander-sections, and a centrally apertured nozzle-facing packing-disk seated on inner shoulders which the expander sections are provided.

In testimony that I claim the foregoing I have hereunto set my hand at Milwaukee in the county of Milwaukee and State of Wisconsin in the presence of two witnesses.

CHAS. D. BREMER.

Witnesses:
  WM. H. HASSE,
  C. A. KOMBE.